United States Patent [19]
Reedy

[11] Patent Number: 5,172,564
[45] Date of Patent: Dec. 22, 1992

[54] INTEGRATED HEAT PUMP WITH RESTRICTED REFRIGERANT FEED

[75] Inventor: Wayne R. Reedy, Edwardsville, Ill.

[73] Assignee: Electric Power Research Institute, Inc., Palo Alto, Calif.

[21] Appl. No.: 699,919

[22] Filed: May 14, 1991

[51] Int. Cl.[5] .............................................. F25B 13/00
[52] U.S. Cl. ..................... 62/160; 62/238.7; 62/197; 62/505
[58] Field of Search ..................... 62/197, 505, 238.6, 62/238.7, 278, 324.1, 160; 237/2 B

[56] References Cited

U.S. PATENT DOCUMENTS 4,727,727 3/1988 Reedy ............................... 62/238.6
4,920,757 5/1990 Gazez et al. ...................... 62/197

Primary Examiner—John Sollecito
Attorney, Agent, or Firm—Wall and Roehrig

[57] ABSTRACT

An integrated heat pump and hot water system can be operated in a space heating mode, a space cooling mode, or a water heating mode, with or without space heating or cooling. In the event that water heating is demanded without either space heating or cooling, a flow restriction arrangement in the liquid refrigerant line is actuated to limit the capacity of the compressor, and thus match the water heat exchanger capacity as much as possible. The selective restrictive arrangement has a valve arrangement selectively blocking the full flow of refrigerant along the condensed refrigerant line, and a restrictive bypass arrangement bridging around the valve arrangement. This can comprise one or more capillary tubes. A quenching branch line extends between the selective restricting arrangement and the suction line that returns evaporated refrigerant to the suction port of the compressor. This quenching branch line favorably comprises a solenoid valve and a flow restricting device connected in series. The valve arrangement of the selective restriction arrangement can be a pair of solenoid valves connected back to back, or can be a pressure activated valve.

7 Claims, 2 Drawing Sheets

INTEGRATED HEAT PUMP WITH RESTRICTED REFRIGERANT FEED

BACKGROUND OF THE INVENTION

This invention relates to combined heat pump and hot water systems that provide heating of an indoor air space, cooling of the indoor air space, and heating of domestic water, with or without heating or cooling.

Integrated heat pump systems of this type have a compressor and indoor and outdoor heat exchanger coils, and a water heat exchanger. Compressed refrigerant flows through the water heat exchanger and gives up superheat to water in the heat exchanger. Then the compressed refrigerant vapor flows via a reversing valve to either the indoor coil (for heating mode) or to the outdoor coil (for a cooling mode). From there the refrigerant proceeds as condensed liquid to the other of the heat exchanger coils, where it passes through an expansion device into the coil, where the compressed refrigerant evaporates and picks up heat. Hot water is provided in either a cooling mode or a heating mode.

Where neither space heating nor cooling is called for, the system can still provide water heating and the water heat exchanger rejects the bulk of the refrigerant heat into the water. In that case, the heat exchanger fan associated with the condenser coil is kept off, but that of the evaporator coil is actuated on. For example, when the reversing valve is set for a heating mode, but space heating is not called for, the indoor fan is not run. On the other hand, when the reversing valve is set for cooling, but cooling is not called for, the outdoor fan is not run. Both superheat and condensing heat are rejected into the water.

The water heat exchanger is rather small in heat transfer capacity relative to the indoor air heat exchanger or the outdoor air heat exchanger. Therefore, when the water heat exchanger serves as the sole or principal refrigerant condenser, as it does during a dedicated water heating cycle when neither heating nor cooling is called for, the heat exchange capacity of the system is unbalanced and no longer matches the pumping capacity of the compressor. Thus, it is necessary somehow to reduce the effective pumping capacity of the compressor when the evaporator coil is generating high pressure due to high air temperatures. One technique to accomplish this is discussed in my earlier U.S. Pat. No. 4,727,727. Another technique involves artificially reducing the compressor suction-pressure by using a regulator or valve in advance of the suction port.

These techniques tend to be rather complex to implement, or can reduce rather than enhance the system efficiency.

The industry has long sought a simple, cost effective way to match compressor efficiency to capacity of the water heat exchanger during times when hot water is demanded, but neither space heating nor space cooling is required.

OBJECTS AND SUMMARY OF THE INVENTION

It is a principal object of this invention to provide a straightforward, economical heat pump system that can provide water heating, with or without space heating or cooling, and which avoids the drawbacks of the prior art.

It is another object to adjust the compressor effective pumping capacity automatically when water heating is demanded without space heating or cooling.

It is a further object to provide a refrigerant flow circuit that accomplishes the aforesaid objects without incurring great additional expense or complexity.

In accordance with any of several preferred embodiments of this invention a selective restriction arrangement is provided in the condensed refrigerant line or liquid line that connects the indoor and outdoor heat exchangers such that the condensed refrigerant flows from the one of the indoor and outdoor heat exchangers that is serving as condenser to the expansion device of the other heat exchanger which is serving as an evaporator. The selective restriction arrangement has a direct path and a parallel restricted path, and a valve arrangement that selectively opens the direct path (for normal heating or cooling) and closes it (for water heating only without space heating or cooling) so that the liquid refrigerant flows, but at a reduced flow rate, through the restricted path. The valve arrangement can incorporate either a pair of solenoid valves disposed back to back or a pressure actuated valve.

A portion of the liquid refrigerant flow is split off and flows through a branch line from the selective restriction arrangement to the suction line in advance of the compressor suction port, where refrigerant liquid is injected into the refrigerant vapor to reduce its temperature. This branch line can include a solenoid valve in series with a flow restrictor such as a capillary or an orifice.

Solenoid valves typically provide on/off flow control in one design direction, but act like a restrictive check valve for flow in the opposite or reverse direction. For that reason, two solenoid valves are employed, back to back, to positively shut off flow in the heat pump liquid line. With both these valve closed, the liquid refrigerant bypasses through a flow control, which in its simplest form can be a capillary tube or an orifice. This flow control limits the refrigerant flow through the evaporator coil (i.e., the outdoor coil where the reversing valve is set for heating) and thus regulates the resulting suction pressure appearing at the compressor suction port. However, on a moderate to warm day the resulting suction flow into the compressor will become warm and can cause the compressor to overheat. Thus, the solenoid valve of the branch line is actuated to open, and some liquid refrigerant flows through a restrictor or expansion device to allow a small stream of liquid refrigerant to mix with the warm suction vapors and cool them before they reach the compressor.

The actual construction of the selective restriction arrangement can vary somewhat, to include two or more capillaries in series, or a pair of check valves back to back in parallel with the back to back solenoids.

The amount of restricted flow that is required can vary depending on the system, and depending on whether the reversing valve is set into a basic cooling or heating mode of operation. The flow restrictor of the selective restriction arrangement can be formed of two flow restrictors, e.g. capillaries, whose junction of connects to the junction of the two solenoid valve. One of the capillaries provides restricted flow when the reversing valve is in the heating mode and the other capillary provides the restricted flow when the reversing valve is in the cooling mode.

The cost and complexity can be reduced by employing one solenoid valve, only in the branch line, and a pressure activated valve (PAV) to control flow in the selective restriction arrangement. In this arrangement, the solenoid is closed for normal operation, and a control line for the PAV, connected downstream of the solenoid, holds the PAV open for full liquid flow in either direction. When water heating alone is called for, the solenoid valve opens and admits pressure to the control line of the PAV, and the liquid flow is bypassed through two restrictions in series. Only a restricted flow then passes through the pair of restrictors to the evaporator heat exchanger coil. The pressure on the PAV control line is about halfway between liquid pressure and suction pressure, and this keeps the PAV shut. However, when cooling, or heating is called for, the solenoid valve of the branch line is actuated shut. Then the pressure in the PAV control line quickly drops to suction pressure. This opens the PAV permitting full refrigerant flow to the evaporator. During normal cooling and heating modes the indoor and outdoor fans are both actuated.

In the case where unequal restrictions of flow are needed based on reversing valve position, a check valve can be positioned in parallel with one of the two series restrictions. Then, in a cooling mode, for example, a lesser restriction is provided while in a heating mode a greater restriction is afforded.

This arrangement increases the efficiency of the heat pump at low cost for the water heating only mode, as the effective capacity of the compressor is adjusted by the selective actuable branch line to match the heat transfer capacity of the water heat exchanger.

The above and other objects, features, and advantages of this invention will present themselves to those skilled in the art from the ensuing description of a few selected preferred embodiments, to be read in conjunction with the accompanying Drawing.

DETAILED DESCRIPTION OF THE PREFERRED EMBODIMENTS

Figure 1:
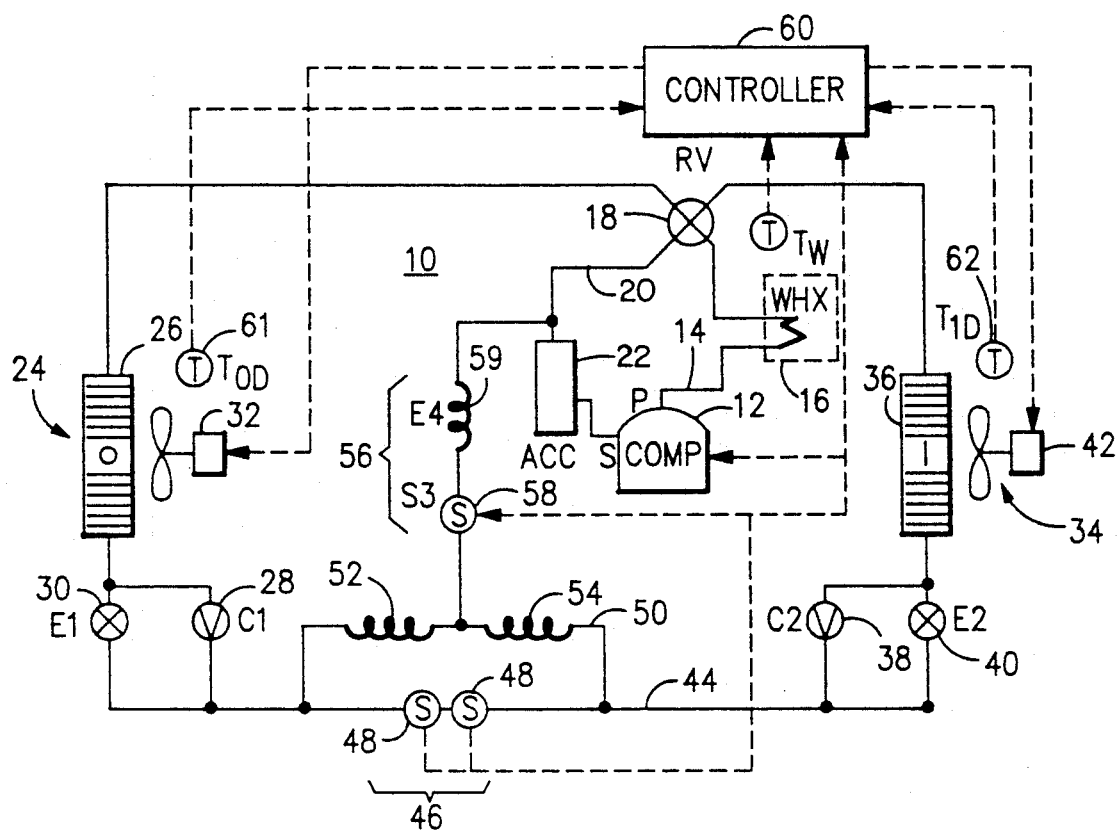
FIG. 1 is a schematic flow circuit diagram of an integrated heat pump and hot water system according to an embodiment of the prior art.

With reference initially to FIG. 1 of the Drawing, an integrated heat pump and hot water system 10 includes a refrigerant compressor 12 of suitable design capable of pumping a refrigerant at a desired operating temperature and pressure. The compressor receives low pressure vapor at a suction port S and discharges compressed refrigerant at a discharge or pressure port P. The latter supplies hot compressed refrigerant through a discharge line 14 to a water heat exchanger 16 that transfers heat from the refrigerant to water that is then supplied to a hot water tank (not shown). Refrigerant then flows from the water heat exchanger 16, to a four way reversing valve 18. The reversing valve has four connections or ports, one of which is connected to the water heat exchanger and another of which is connected through a suction line 20 to the suction port S of the compressor 12. An accumulator or dryer 22 is interposed ahead of the compressor 12 to intercept liquid or moisture that might be present in the refrigerant fluid in the suction line 20.

The other two ports of the reversing valve connect respectively to an outdoor heat exchanger 24 and an indoor heat exchanger 34, described in greater detail later. The reversing valve 18 has a cooling or air conditioning position and a heating position. In the cooling position, the outdoor heat exchanger serves as the condenser while the indoor heat exchanger serves as evaporator. In the heating position, the indoor heat exchanger 34 serves as the condenser while the outdoor heat exchanger 24 serves as the evaporator. The reversing valve 18 can be of any of a number of known designs.

The outdoor heat exchanger 24 comprises an outdoor evaporator/condenser coil 26 that is connected at one end to the reversing valve 18 and at the other end to a check valve 28 and an expansion device 30. An Outdoor fan 32 forces outdoor air over the heat exchanger coil 26 for transfer of heat between the refrigerant and the outdoor air.

An indoor heat exchanger 34 comprises an indoor evaporator, condenser coil 36 that is connected at one end to the reversing valve 18 and at the other end to a check valve 38 and expansion device 40. An indoor fan 42 forces air from the indoor comfort or living space over the coil 36, for transfer of heat between the indoor air and the refrigerant in the coil 36.

A condensed refrigerant line or liquid line 44 connects the two heat exchangers 24 and 34. In the heating mode, condensed refrigerant flows from the indoor coil 36, through the check valve 38 and liquid line 44, and then through the expansion device 30 into the outdoor heat exchanger coil 26. When the reversing valve 18 is set to place the system 10 in a cooling mode, the condensed refrigerant flows from the outdoor coil 26, through the check valve 28 and line 44, and then through the expansion device 40 into the indoor heat exchanger coil 36.

In this embodiment a selective restricting arrangement 46 is interposed in the liquid line 44 between the two heat exchangers. In a main branch, there are two solenoid valves 48 disposed back to back, and there is a parallel restriction bypass 50 bridging around the solenoid valves 48. Here the bypass 50 comprises a first capillary tube 52 and a second capillary tube 54 which limit the flow of refrigerant into whichever of the coils 26, 36 is serving as evaporator coil during times when water heating is provided but neither indoor heating nor cooling is called for. The two solenoids 48 are employed in back to back arrangement for positive on/off control. Each solenoid valve 48 provides positive flow control only in the design direction, but serves as a restrictive check valve for flow in the reverse of the design direction. Therefore, for this heat pump system, where flow through line 44 can be in either direction, the two solenoid valves 48 are needed to shut off flow effectively in both directions.

A quenching branch line 56 connects the selective restricting arrangement 46 to the suction line 20 and permits a restricted flow of the condensed refrigerant into the suction line 20 during times when water heating is demanded, but not space heating or cooling. In this embodiment, the quenching branch line 56 comprises a series arrangement of a solenoid valve 58 and a capillary tube or other flow restrictor 59.

As is also shown in this embodiment, a suitable controller as temperature input device 61 to measure outdoor air temperature $T_{od}$, temperature sensor device 62 to measure the indoor air temperature $T_{id}$, and a temperature input sensor 63 to measure the water temperature $T_w$. The controller has outputs also to control the outdoor fan 32, the indoor fan 42, the compressor 12, and the solenoids 48, 48, and 58.

In a water heating only operation, the fan associated with the evaporator coil is turned on but the fan associated with the condenser coil is held off, so that the water heat exchanger 16 operates in a full condenser mode rather than a desuperheating mode. For example, if the reversing valve 18 is set into a space heating position, the indoor fan 42 would be held off when water heating only is demanded, but the outdoor fan 32 would be actuated on.

In the water heating only mode, because the water heat exchanger 16 is serving as the condenser coil, the pumping capacity of the compressor does not match the capacity of the system to shed heat that is picked up by the evaporator coil. Therefore, the effective pumping capacity of the compressor 12 has to be adjusted. In a normal cooling or space heating operation, the solenoid valves 48 are held open, and refrigerant liquid can pass, without significant obstruction, to the expansion device 30 or 40. When a water heating only mode is initiated, the solenoid valves 48 are closed, and the refrigerant flow is diverted through the restricted branch 50. This restricts the flow of refrigerant to the evaporator coil (i.e., either the indoor coil 36 or outdoor coil 26) and thus maintains the suction pressure of the compressor 12 at a reduced level. The flow through the liquid line 44 is thus reduced to the bypass flow permitted through the restriction devices i.e. capillary tubes 52 and 54. After passing through the bypass expansion devices, the reduced refrigerant flow easily passes through the normal expansion device 30 or 40 into the associated coil 26 or 36. When operated in this manner, the suction gas being returned to the compressor will be relatively warm. In order to cool the suction gas, the quenching branch line 56 provides a small flow of liquid refrigerant which is fed through the solenoid valve 58 and the flow restrictor 59 into the suction line 20, here at a point in advance of the accumulator 22. The injected condensed refrigerant reduces the temperature of the refrigerant vapor appearing at the suction port S of the compressor 12.

Figure 2:
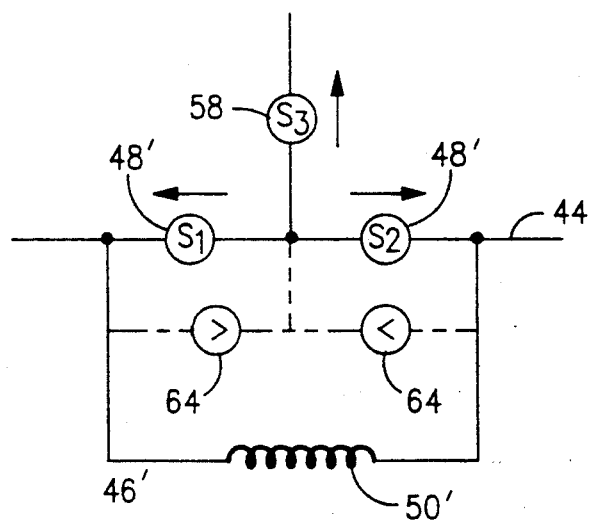
FIGS. 2 to 5 are partial schematic diagrams of portions of the integrated heat pump and hot water system according to other embodiments of this invention.

FIG. 2 shows the pertinent parts of another embodiment of this invention, in which the same reference numerals are applied to identify similar parts, but to which a prime is applied. Here the selective restricting arrangement 46' that is interposed in the condensed refrigerant line 44 is of a variant form. The remaining portions of the system 10, not shown, would remain substantially the same as in the first embodiment. Here, the solenoid valve 58 of the quenching circuit is coupled to the junction of the two back-to-back solenoid valves 48'. The bypass restriction 50' comprises a single capillary tube or similar flow restrictor. As aforementioned, the solenoid valves 48' are effective to block flow only in the design direction, but serve as restrictive valves in the opposite direction. Thus, when the valves 48' are actuated on, a sufficient flow is provided to feed the branch line through the solenoid valve 58. In this schematic, check valves 64' are illustrated, with dotted lines, as being connected in parallel, with the respective solenoid valves 48'. However, actual physical check valves 64' need not be employed because of the aforementioned operation of the solenoid valves 48'.

Figure 3:
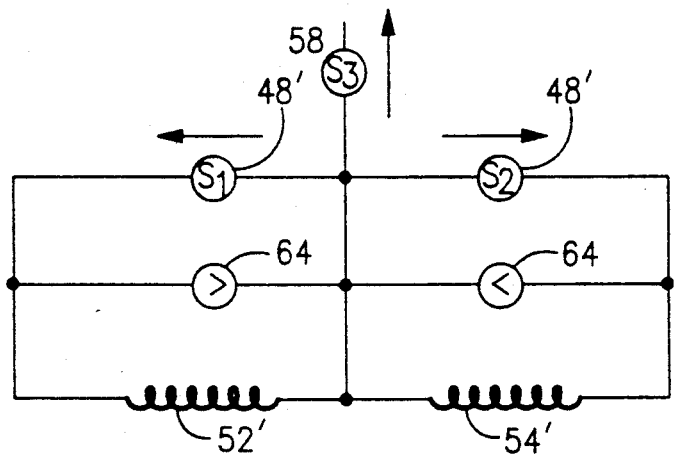

FIG. 3 illustrates the selective restricting arrangement of a third embodiment, which is similar to that of FIG. 2, except that the restriction bypass 50 here is formed of first and second capillary tubes 52' and 54' whose junction is connected to the junction of the solenoid valves 48', 48', as well as to the junction of the check valves 64', 64'. This permits the restricted flow to be different depending on whether the reversing valve 18 is set into a cooling position or a heating position.

Figure 4:
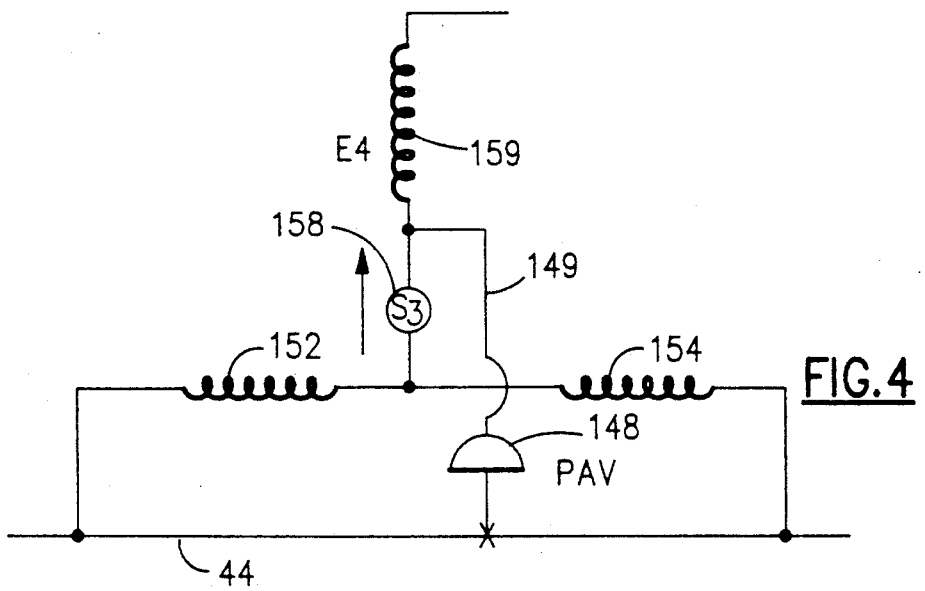

In a further alternative embodiment of FIG. 4, a selective restricting arrangement 146 omits the back-to-back solenoid valves and instead employs a pressure actuated valve (PAV) 148 interposed in the condensed refrigerant line 44. Here, the bypass line 150 comprises first and second capillary tubes 152, 154, with the solenoid valve 158 being connected to the junction of these two capillary tubes and being followed by the flow restrictor or capillary tube 159 that leads to the refrigerant suction line 20. A control line 149 for the PAV 148 is connected to the junction of the solenoid valve 158 and the flow restrictor 159. When the solenoid valve 158 is closed, i.e., during normal cooling and heating modes, the pressure appearing in the control line will be substantially at the suction pressure of the compressor 12. This holds the PAV 148 open, so that full flow of condensed refrigerant is provided along the line 44. When water heating only is called for, the solenoid valve 158 opens. Then, the control line 149 will experience a pressure rise to a pressure level part way between the suction pressure and the pressure of the condensed refrigerant. This increased pressure closes the PAV 148 so that condensed refrigerant flow is bypassed through the capillary tubes 152 and 154.

Figure 5:
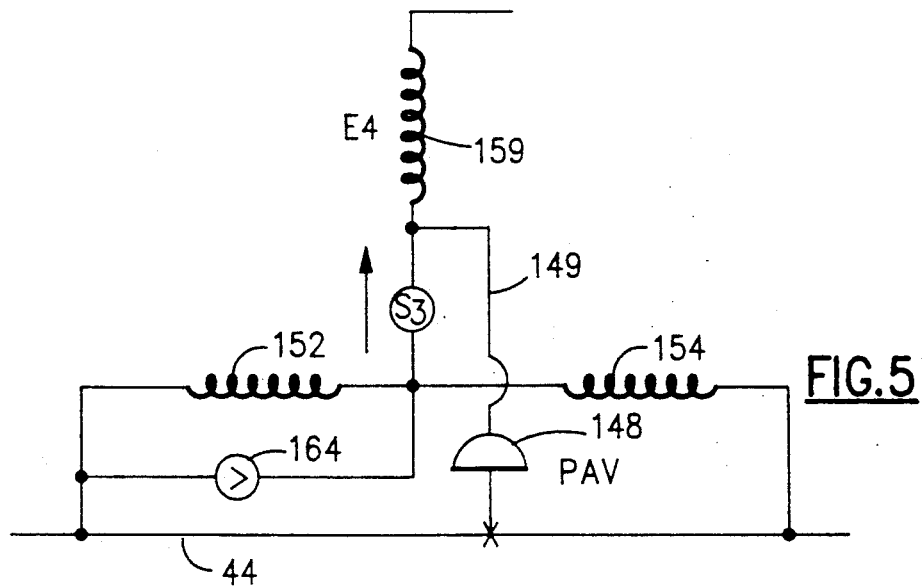

FIG. 5 shows another variant of the selective restricting arrangement 146 of FIG. 4, with the difference being that a check valve 164 is provided in parallel with one of the flow restricters or capillary tubes 152. In this embodiment, the amount of flow restriction depends on the setting of the reversing valve 18. However, in all other respects, the operation of this arrangement is the same as that of FIG. 4.

It should be understood that the flow restricting devices are not limited to capillary tubes, but could be orifices or other devices. In addition, many other modifications and variations would be possible without departing from the scope and spirit of this invention, as defined in the appended claims.

What is claimed is:

1. An integrated heat pump and hot water system capable of providing cooling to an indoor space, heating of said indoor space, and water heating with or without heating or cooling of said indoor space; comprising a refrigerant compressor having a discharge port from which compressed refrigerant vapor is discharged and a suction port to which the refrigerant is returned as low pressure vapor;

a water heat exchanger following said discharge port for transferring heat from the compressed refrigerant to water in the water heat exchanger for heating the water;

an outdoor heat exchanger which includes a heat exchanger coil having first and second refrigerant ports, an associated outdoor fan for forcing outdoor air over the outdoor heat exchanger coil, and an outdoor expansion device coupled to the second refrigerant port;

an indoor heat exchanger which includes a heat exchanger coil having first and second refrigerant ports, an associated indoor fan for forcing indoor air over the indoor heat exchanger coil, and an indoor expansion device coupled to the second refrigerant port of the indoor heat exchanger coil;

a reversing valve having a first port coupled to the water heat exchanger to receive the compressed refrigerant therefrom, a second port coupled to a suction line that connects to the suction port of said compressor to supply said low pressure refrigerant vapor thereto, and third and fourth ports respectively connected to the first ports of said outdoor and indoor heat exchanger coils, respectively; said reversing valve having a heating position in which the compressed refrigerant is supplied to the indoor coil and the low pressure vapor is returned from the outdoor coil, and a cooling position in which the compressed refrigerant is supplied to the outdoor coil and said low pressure vapor is returned from said indoor coil;

a condensed refrigerant line connecting the indoor and outdoor heat exchangers and supplying condensed refrigerant from one of said heat exchanger coils to the expansion device of the other heat exchanger, said line including selective restriction means providing unrestricted refrigerant flow in said condensed refrigerant line under conditions of heating or cooling of said indoor space, but restricting said refrigerant flow therein under conditions of water heating in said water heat exchange only, but not heating or cooling said indoor space and wherein said indoor or outdoor fan, respectively, is not actuated; and a quenching branch line coupled between said selective restriction means and said suction line for injecting a restricted flow of said condensed refrigerant into the low pressure refrigerant vapor in said suction line under said conditions of water heating only.

2. Integrated heat pump and hot water system according to claim 1, wherein said selective restriction means includes a pair of solenoid valves connected back to back in said condensed refrigerant line and at least one flow restriction device connected in parallel to said pair of solenoid valves, said valves being actuated open when heating or cooling is called for, but off when water heating only is called for.

3. Integrated heat pump and hot water system according to claim 2, wherein said quenching line includes a flow restrictor and third solenoid valve connected in series therewith between a juncture of said pair of solenoid valves and said suction line.

4. Integrated heat pump and hot water system according to claim 2 wherein said at least one flow restriction device of said selective restriction means includes a pair of flow restrictors coupled in series and said quenching line includes a third restrictor and a third solenoid valve connected in series between a junction of said pair of flow restrictors and said suction line.

5. Integrated heat pump and hot water system according to claim 1 wherein said selective restriction means includes a pressure activated valve disposed in said condensed refrigerant line and a flow restriction bypass across said pressure activated valve, said valve having a control input for opening and closing the solenoid valve, and wherein said quenching line includes a solenoid valve coupled to said flow restriction bypass and a flow restrictor that is connected between said solenoid valve and said suction line, and said control input is connected to a junction of said solenoid valve and said flow restrictor.

6. Integrated heat pump and hot water system according to claim 5 wherein said flow restriction bypass includes a pair of flow restrictors connected in series, and a one-way check valve disposed in series with one of said pair of flow restrictors.

7. Integrated heat pump and hot water system according to claim 1 comprising a controller which actuates said outdoor fan, said indoor fan, said selective restriction means and said quenching line, and which under conditions of water heating only is operative to actuate said selective restriction means to restrict refrigerant flow in said condensed refrigerant line, to actuate said quenching line to admit said condensed refrigerant into said suction line, and to actuate one only of said indoor fan and said outdoor fan.

* * * * *